May 20, 1930.  V. L. GIBSON  1,758,941
CITRUS PRODUCTION DEVICE
Filed Sept. 13, 1927   2 Sheets-Sheet 1
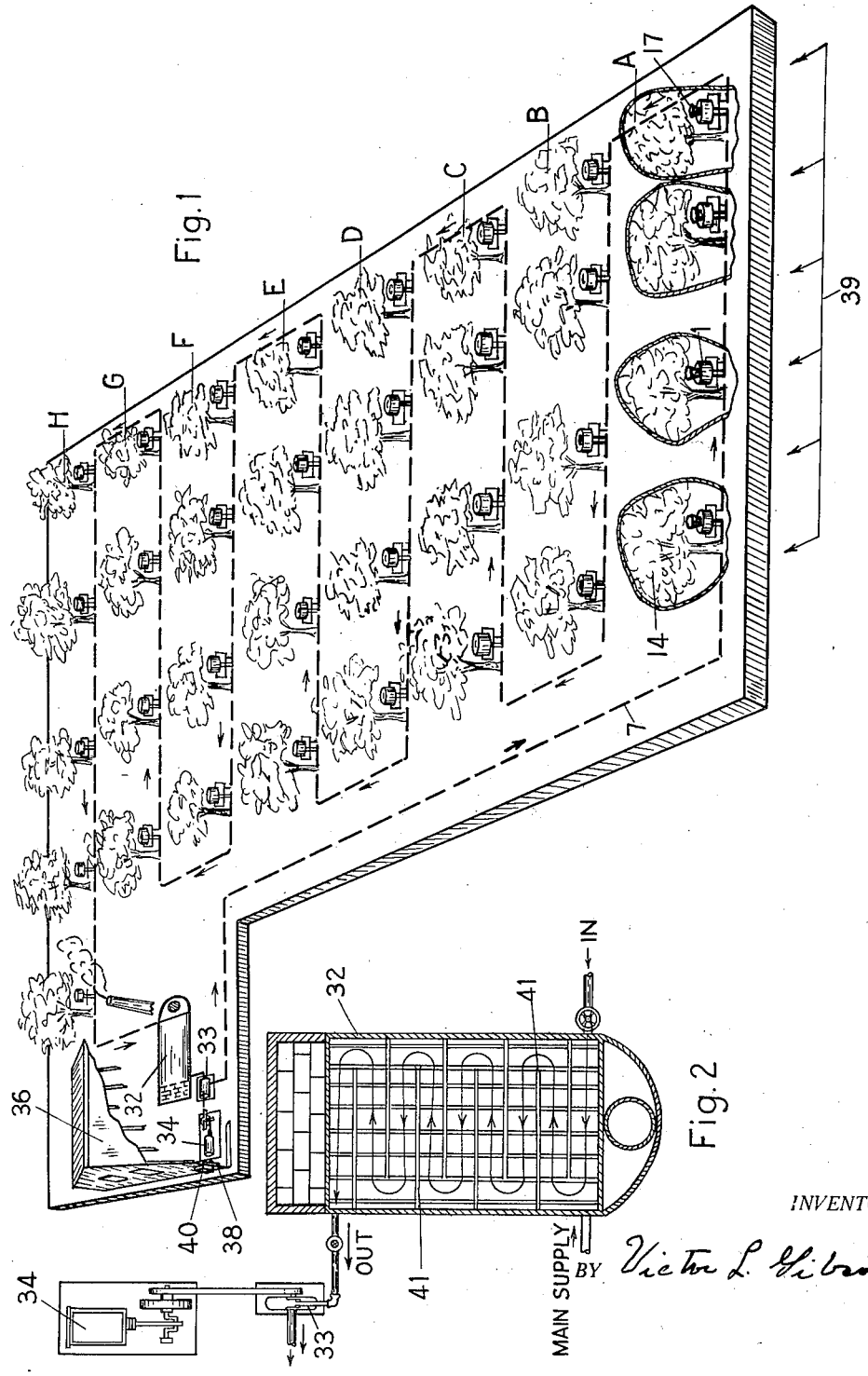
INVENTOR.
BY Victor L. Gibson May 20, 1930.  V. L. GIBSON  1,758,941
CITRUS PRODUCTION DEVICE
Filed Sept. 13, 1927  2 Sheets-Sheet 2

INVENTOR.
BY *Victor L. Gibson*

Patented May 20, 1930

1,758,941

UNITED STATES PATENT OFFICE

VICTOR L. GIBSON, OF LOS ANGELES, CALIFORNIA

CITRUS-PRODUCTION DEVICE

Application filed September 13, 1927. Serial No. 219,359.

This invention refers to devices for compositely heating, and irrigating, citrus orchards and the like.

The objects of the invention are based on results obtained through research conducted by the University of California, college of agriculture, agricultural experiment station; U. S. Department of Agriculture; University of California, agricultural experiment station, in co-operation with the United States Weather Bureau and the farm bureau, Los Angeles County.

The principal objects will be enumerated and hereinafter described.

The provision of a device which will accomplish as a unit, means to heat, and irrigate, citrus orchards in an improved manner.

The provision of a device for irrigation purposes wherein the temperature of the water is controllable, where the water supply is regulated by its penetration in the soil and directed throughout the root feeding area, and where a more economical use of the water may be had, as well as a better effect in distribution.

I provide a float chamber which consists of a cast iron tank which is attached to a main pipe line water supply. A flue or thimble is positioned through the tank near the top and is welded therein where it passes through the side walls of the tank. In the center of this flue is placed a stick of glow bar which is connected to an electrical circuit and centers through caps covering the ends of the flues. A float is arranged in the tank to operate a valve at the bottom and will be adjusted to keep the tank filled with water to a point just over the top side of the heater flue.

A main pipe line water supply and conduits carrying the current to operate the device will be located near the trees, and a device placed under each tree and connected to the main supply of water and current is also proposed.

A short section of large size perforated pipe is placed in the ground near the device and tree and is arranged to collect water that overflows from the device when it is used for irrigation purposes. In the perforated pipe will be placed a float connected to a vertical lever which is connected to a ball check valve on a by-pass water pipe connected to the branch water line which discharges in the tank.

The water in the main supply pipe is heated in an open top heater of the return tube type with baffle plates arranged to circulate the water and distribute it around and between the flues to obtain the best heat contact, flowing in the direction indicated by the lines and arrows from the point of entrance to the point of discharge. This heater will be placed in a central heating plant in the circulating system of the orchard where it will be regulated by one man. It will therefore be obvious that the first step in the prevention of frost comes through the main water supply pipe, circulating a heated liquid through the pipes to warm the soil. The second operation in the cycle or relay of orchard heating is the provision of the electric glow bar which intensifies the already heated water to the point of vaporization, thus creating a mist or blanket fog over the region which has already been warmed from the heat in the underground pipes. The third operation in the cycle or relay of orchard heating is to create a means of increasing the temperature of the air at the earth's surface under the blanket of mist or fog now already created, by evaporating the water in the heaters below the glow bars and allow them to give off heat by radiation.

When the latent heat of vaporization is insufficient to check the fall in temperature entirely, the glow bar heating will be resorted to.

On moderately cold nights protection against frost can be afforded by turning fairly warm irrigation water from the tanks on the ground surface beneath the trees.

In the present method of irrigation, I eliminate the one weak point of the furrow system, that of giving the source of the run more moisture than the end of the run. As a further result, I eliminate the danger of accumulaton of salts in the surface soil by effecting a proper distribution of water to each tree.

In my improved device all irrigation and fertilizing is carried on beneath the surface, therefore, fumigation can be carried on at the same time without danger to the trees from moisture conditions existing at the surface.

The objects and provisions hereinbefore referred to will now be described in conjunction with a present embodiment of the invention illustrated in the accompanying drawings in which Figure 1 is a perspective view of a typical orchard installation of my device in combination therewith.

Figure 2 is a plan and sectional view of an engine connected to a pump for the purpose of distributing and circulating water heated in a supply tank throughout the region controlled by the device shown on enlarged scale apart from the main system.

Figure 3:
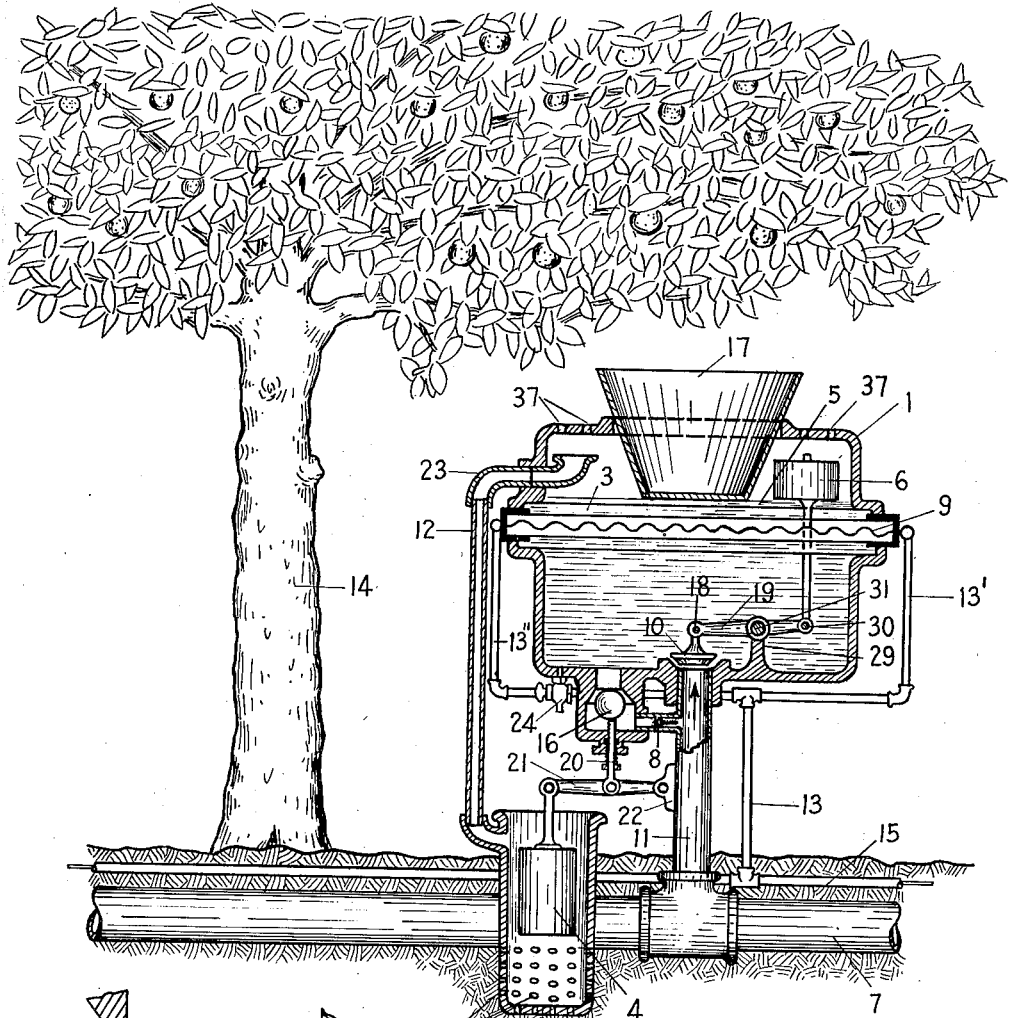
Figure 3 is a typical cross section vertically taken through one of the devices in spaced relation to one of the trees.

Referring particularly to Figure 1, I show a typical orchard consisting of any number of trees at or near the base of which I place my device 1. They are connected to a main water supply system which is circulated through the pipes by first passing through a supply tank or open heater. The underground pipe line through which the water is circulated for heating and irrigation purposes is indicated by the numeral 7. Connected to the system is an engine 34, which operates a pump 33, which circulates the water in and out of the supply tank or open heater 32. The direction of flow is shown by numerous arrows throughout the lines and from the point of entrance to the point of discharge in the heater. A reservoir or main supply furnishes water to the supply tank from whence it is circulated. In Figure 2 is an enlarged portion of the pump, engine and supply tank shown in Figure 1 which illustrates how the circulation through the supply tank is brought about through the baffling 41 contained in the supply tank.

It is proposed to electrify the devices with electric heaters preferably in rows, starting always with the windward side of the orchard. The master switches to operate the heaters being situated in a switchboard 38 contained in the central heating plant 36.

The air movement in groves is generally steady and is normally from one direction. On account of this condition and always knowing the direction of the air drainage, one is enabled by having the devices electrified in rows, as A, B, C, D, E, F, G and H, or check lines to start operating those first, the direction of the flow of the air 39 wafts the warm air throughout the rest of the orchard and the turning on of the remainder of the heater opposite to the windward side of the orchard, as H, G, F, E, and D, can sometimes be eliminated entirely.

It is deemed advisable, however, to bank the flow and retard the dry heat in different rows of the orchard, as for example in rows D and H, by generating in these rows a mist or fog. In this manner, one has a complete check in the abatement of frost.

The electrification of the devices in multiples also stabilizes the cost of electricity when the trees are being fumigated, as shown by the tent covered trees in row A.

Describing now my device more in mechanical detail and with reference particularly to Figure 3, 1 is the device hereinbefore referred to.

It is proposed to operate the devices by a thermostatic control 40 which is affected by the temperature of the outer atmosphere and will cut in the heater when a dangerous temperature is approaching and will remain in circuit during the danger period.

The device is preferably made out of cast iron the better to withstand the elements. It consists of a tank cylindrical in form mounted on a branch pipe 11, supported by the main line yet placed relatively close to the ground. At a point where pipe 11 is screwed into the tank is located a valve 10, which is rubber seated and which is operated by a float 6. It is controlled by a link 19 journaled in the base of the tank by a pivotal support 29 and is oscillative upon a pin 31. The valve is fastened to the link 19 with a pin 18 and likewise to the float with a pin 30. When the tank is filled with water, the float 6 closes the valve 10. Diametrically opposite and near the top of the tank is positioned an electric glow bar heater tube 3 containing a heating element 9. It has a twofold purpose, that of evaporating the water in the tank to create a mist or fog, and to create a radiant heat. The two ends of the tube are subjoined by conduit pipes 13', 13'' and are connected to a main source of electrical supply conduit 15 by the branch conduit 13.

The water 5 in the tank is allowed to just cover the glow bar before it is shut off by the valve 10. This allows a mist or fog to be generated quicker than if the glow bar was submerged further into the water.

In close proximity to the support 11 is a perforated receptacle or sump 2. It is partly submerged in the earth and is supplied with water from the tank through the overflow pipe 12 fed through the spout 23. It is perforated to allow a gentle seepage through the soil. These perforations may vary in size and numbers all depending on the nature of the soil and the condition of its porosity.

Contained within the perforated receptacle 2 is a float 4 which is used to shut off the supply of irrigating water when the soil becomes saturated. This is accomplished in the following manner. The float 4 is pivotally connected to a link 21 which is fulcrumed in a bracket 22 fastened to the container support. Vertically supported upon the link 21 is a plunger 20 which projects through a stuffing box and upon which is poised a ball check valve 16.

There is a branch by-pass water pipe 8 for irrigation which supplied water to the tank at a predetermined pressure and causes it to overflow in the perforated receptacle until shut off by the ball check valve 16 when operated by the float 4 from the condition of fill in the perforated container.

Conveniently situated in the bottom of the tank is a drain 24 which is used to spread warm water over the surface of the ground under the tree.

Figure 4:
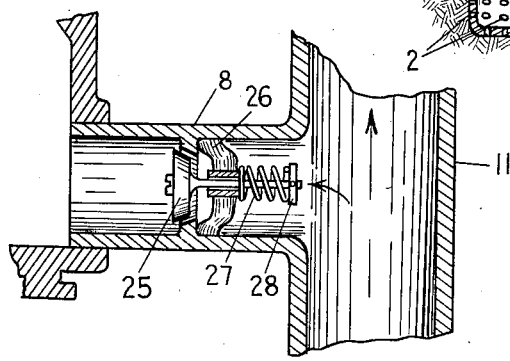
Figure 4 is an enlarged cross sectional view taken through a portion of the device to illustrate the construction of a check valve placed in the by pass water pipe to be used in irrigating and arranged to open at a predetermined pressure and automatically close upon a cessation of that pressure.

In order to provide for a means to irrigate, it is necessary to provide a check valve in the by pass, which will be operated at a predetermined pressure. It consists of a valve 25 (see Figure 4), which is seated in the diaphragm 26 of the pipe 8. A spring 27 bearing against a washer 28 normally keeps the valve closed until it is opened by pressure from the main line. The pressure in the main line is built up by closing the return valve at the central heating plant. In the top of the tank is glazed earthenware vessel 17 in which the dosage is placed for fumigating; heat being supplied either from the glow bar 3 or the water 5 to aid in its gasification.

Should it be found expedient to keep the earthenware vessel in position on account of preventing litter from falling from the trees into the container, it will be necessary to provide holes 37, 37 in the top of the device when it is desired to create a mist or fog in the relay of orchard heating.

In this specification and the accompanying drawings, I have described and shown a preferred form of my invention and have specifically mentioned certain of its more important objects. I do not wish to limit myself to the forms disclosed since various changes and adaptations may be made therein without departing from the essence of my invention as hereinafter claimed; and objects and advantages other than those specifically mentioned are included within its scope.

Having thus fully described my invention, I claim:

1. In an underground water system, means to heat and circulate the water therein, a branch line connected with said water system, a tank supported above the ground by said branch line, means to discharge water into said tank from said branch line, means for heating the water in said tank, a by-pass in said branch line, means to discharge water through said branch line into said tank, an overflow in said container, a perforated sump adjacent to said container and adapted for location in close proximity to the trees of an onchard, an overflow pipe connecting said overflow and said sump, and a supply tank wherein to heat said water which is to be circulated through said system, and distributed to said trees through said tanks.

2. In apparatus of the character described, an upright branch pipe projecting above the surface of the ground, underground means to supply water to said pipe, a tank mounted on and supported by said pipe to be supplied with water therethrough, a sump consisting of a receptacle located beneath said tank, said receptacle having an upstanding portion and a perforated portion located beneath the surface of the ground, and an overflow pipe leading from said tank to said receptacle.

3. In apparatus of the character described, an underground supply pipe, an upright branch pipe communicating therewith, a tank mounted on said branch pipe at a distance above the surface of the ground, a sump located near said upright pipe, a float in said sump, a link having one of its ends pivotally connected with said float and its other end pivotally supported by said upright pipe, means operatively connected with the intermediate portion of said link to regulate the supply of water through said upright pipe to said tank, and means to conduct the overflow from said tank to said sump.

4. In apparatus of the character described, a tank adapted to supply water vapor to an orchard, a water supply conduit for said tank, a sump for sub-soil irrigation, an overflow pipe for said tank in communication with said sump, a float-operated shut off to control the water supply to said tank at a relatively low pressure, and a by-pass adapted to supply an additional amount of water to said tank at a predetermined higher water pressure in order to cause overflow of water from said tank to said sump.

5. The substance contained in claim 4, and, a controlling device, actuated by a float in said sump to check the flow through said by-pass when the water in said sump has reached a predetermined level.

6. In combination with a main conduit adapted to circulate water through an orchard, individual tanks in spaced relation to each other, supports for said tanks, said supports being adapted for fluid transmission, said tanks being provided with a float shut off whereby to regulate the amount of discharge thru said support into said tank from said conduit, a by-pass from said conduit for discharging further into said tank, an overflow line connected with said tank to moisten the soil, and means for discharging into said overflow line.

7. The substance contained in claim 6, and, a perforated receptacle connected to said overflow line, a portion of which is embedded in the soil, and means for discharging through said overflow line into said receptacle.

8. The substance contained in claim 6, and, a perforated receptacle connected to said overflow line, a float in said receptacle, a link fulcrumed to the support of said tank, a vertical plunger connected to said link and projecting into said tank, a ball check valve in aforesaid by-pass line, means for regulating the discharge through said by-pass overflowing into said perforated receptacle by means of said float and said ball check valve.

9. An irrigating apparatus comprising conduits to supply water to the trees of an orchard, a supply water heater for said conduits, branch pipes vertically extending from said conduits, a tank supported thereby, means to discharge into said tanks, means to re-heat said discharge therewithin, a by-pass line from said branch pipe connected to said tank, means through a predetermined pressure to discharge through said by-pass into said tank, an overflow in said tank, regulative means for discharging through said by-pass into said overflow, and underground outlets connected to said overflow for discharging the water therefrom.

VICTOR L. GIBSON.